Jan. 13, 1953     R. L. LOGAN     2,625,558
PROCESS FOR MAKING ORGANIC COMPOUNDS
Filed Aug. 23, 1950
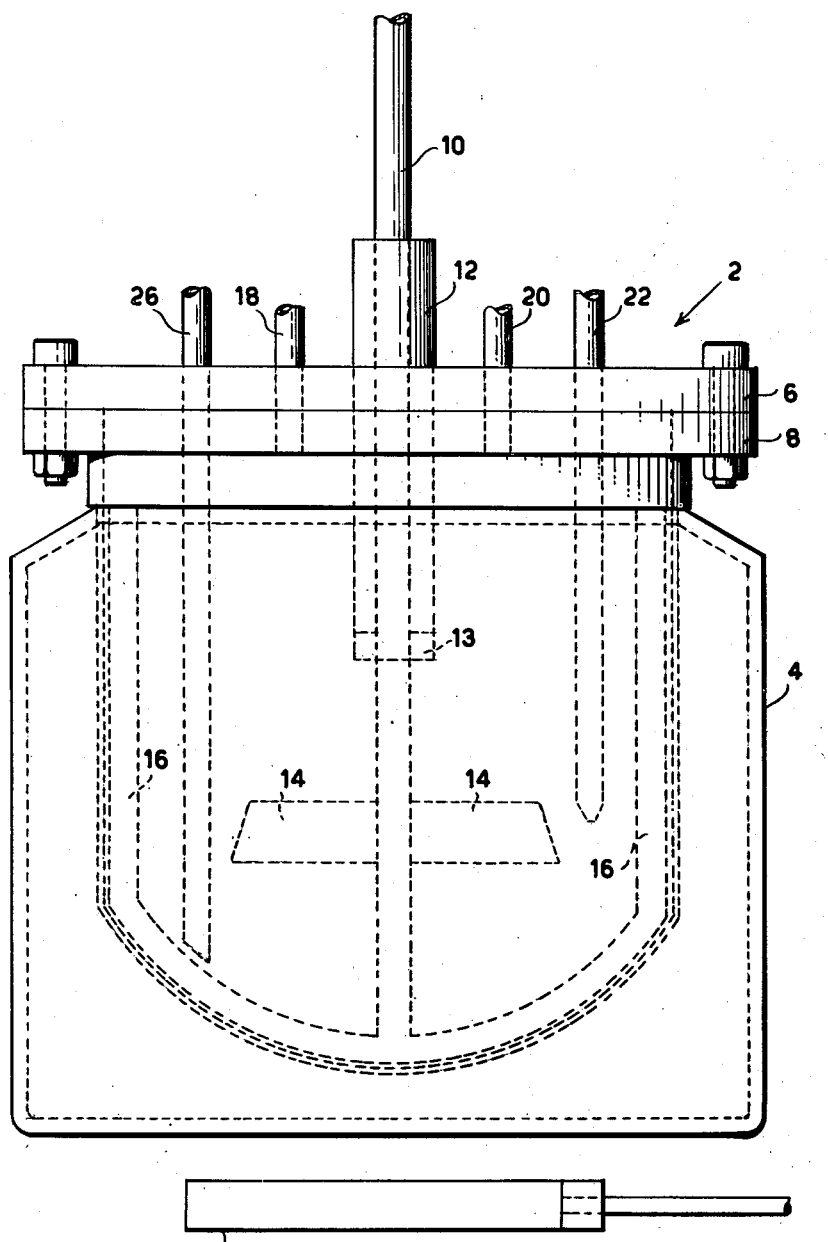
INVENTOR.
ROGER L. LOGAN
BY
ATTORNEYS.

UNITED STATES PATENT OFFICE 2,625,558

PROCESS FOR MAKING ORGANIC COMPOUNDS

Roger L. Logan, Philadelphia, Pa., assignor to Kessler Chemical Co., Inc., Philadelphia, Pa., a corporation of Pennsylvania Application August 23, 1950, Serial No. 181,057

13 Claims. (Cl. 260—413)

This invention relates to the conversion of polyhydroxy fatty acids into other organic compounds including the corresponding dibasic acids, monobasic acids, omega hydroxy acids and n-monohydric alcohols.

It has been found that polyhydroxy fatty acids can be split through the use of caustic to produce the corresponding monobasic acids, dibasic acids, omega hydroxy acids and n-monohydric alcohols. This result is unexpected since the reaction is carried out at elevated temperatures under which conditions one would normally except the polyhydroxy acid to dehydrate.

A further and surprising result is that these products can selectively be produced in large yield and in a pure state. Thus, for example, azelaic acid, sebacic acid and brassylic acid of unusual purity can be obtained by using the method of this invention. By way of further example, the pelargonic acid obtained is much purer than any heretofore obtained by a practicable commercial process.

The method in accordance with this invention comprises, broadly, reacting a polyhydroxy fatty acid with caustic in a liquid state at an elevated temperature. The polyhydroxy fatty acid is preferably added slowly to the caustic which has previously been heated to the desired temperature.

Mixed dibasic acids can be produced if varied position isomers of polyhydroxy compounds are used as starting materials.

Generally speaking, in carrying out the method of this invention when it is desired to produce a n-monohydric alcohol or an omega hydroxy acid in large yield, a polyhydroxy fatty acid is added in small increments to a caustic water solution which has been preheated to a temperature of about 190° to 300° C. in a suitable reaction vessel. The alcohol formed is continuously distilled out of the mixture and collected in the separator, whereas the water distilled is returned to the process.

On completion of the reaction which takes from two to six hours, the reaction mass is cooled, diluted and acidulated with a mineral acid to a pH of 5.5 to 6.5. The oil layer is removed and the water layer is further acidulated to a pH of about 2, an oil layer is then again separated. The separated oil layers are admixed and washed with a plurality of portions of boiling water. The washings are combined with the original water layer. The oil layer is steam distilled to collect the monobasic acid.

The water layers are evaporated to a suitable concentration of dibasic acid and omega hydroxy acid. The solution is then cooled to about 15° C. and the dibasic acid and the omega hydroxy acid crystallized. The crystals are filtered and washed free of salt and dried.

In order to promote the reaction, it is sometimes helpful to pass a stream of molecular oxygen or air over the reaction, particularly when the lower portion of the 190° C. to 300° C. temperature range is used.

Where, on the other hand, it is desired to produce large amounts of the corresponding dibasic and monobasic acids and very small amounts of alcohol or omega hydroxy acids, dry caustic is melted and the temperature is maintained between the melting point of the caustic and the temperature just below that at which the products decompose, about 475° C. The selected polyhydroxy acid is then added in small portions. The reaction is usually complete as soon as all of the increments of the polyhydroxy acid have been added. Due to the high temperatures, it is necessary to exclude most of the oxygen or air from the reaction vessel to prevent carbonization. The reaction will proceed in an atmosphere, for example, of either $CO_2$ or $N_2$.

At the completion of the reaction, the alkali salts are processed in exactly the same manner as discussed above in connection with the low temperature reaction, the only difference being that the dibasic and monobasic acids are recovered in high yield, whereas only traces of the alcohols and omega hydroxy acids are recovered.

It will be apparent that this reaction can be carried out in the presence of water at the specified temperatures if a kettle of strength adequate to withstand the developed pressure is used. It is, of course, possible to carry out the method of this invention as a continuous operation.

The polyhydroxy acid may be any polyhydroxy acid having from 11 to 22 carbon atoms, such as, for example, 9, 10 dihydroxy stearic acid, 10, 11 dihydroxy undecanoic acid, trihydroxy stearic acid, tetrahydroxy stearic acid or 13, 14 dihydroxy behenic acid.

It will, of course, be appreciated that all of the position isomers of the above mentioned compounds can also be utilized as well as their functional derivatives such as, for example, esters, amides and alkali metal salts and the term "polyhydroxy acid compound" where used in the specification and claims is intended to include such compounds.

The term "polyhydroxy acid" is also intended to include epoxy compounds since epoxy groups may be transformed to hydroxy groups by the action of caustic.

The caustic may be derived from any of the alkali metals such as barium, lithium, calcium, sodium or potassium. The hydroxides and oxides of these alkali metals may, of course, also be used. Due to their low cost, sodium or potassium are preferred.

The method of this invention can be carried out in well known conventional apparatus. The apparatus of the figure, which is a partially diagrammatic side elevation of the apparatus, is illustrative. It will be apparent that the apparatus shown in no way limits the scope of the process.

As shown in the figure, a kettle 2 is surrounded by a jacket 4 containing a heating fluid. The kettle is provided with a top 6 which is bolted to kettle flange 8.

A driven shaft 10 passes through stuffing box 12, has a packing retaining ring 13 and is secured to agitators 14, 14 and 16, 16.

The top 6 is also provided with an inert gas injector 18 and an inert gas vent 20. An injector 22 for hydroxy compound passes through top 6 and terminates near agitators 14, 14. A thermo well is shown at 26.

The heat is supplied to the fluid in jacket 4 by means of a gas burner 28.

When it is desired to steam distill off certain products, conventional distillation and separation equipment is connected to the kettle through inert gas vent 20.

The following specific examples of large yield recovery of omega hydroxy acids and n-monohydric alcohols will further clarify this invention:

Example I 62 parts of 9, 10 dihydroxy stearic acid (low melting form, 90° C.) was heated for 5 hours at 240° C. to final temperature of 300° C. with 70% caustic soda. The hydroxy acid was added over a period of 1½ hours. During the reaction there was continuously distilled off alcohol and water. The alcohol was separated from the water, and most of the water was returned to the reaction. The soaps were cooled, diluted and slowly acidulated with hydrochloric acid. An oil layer separated. The oil layer was extracted with boiling water and dried. It was then steam distilled to remove pelargonic acid. Some pelargonic acid and azelaic acid were recovered. The palargonic acid was nearly water white and had a molecular weight of 153 and an $N_D$ 20° of 1.4308. The crude alcohol had an $N_D$ 23.5° of 1.4300, and was a good grade of n-nonyl alcohol.

The water layers were evaporated, cooled, crystallized and the azelaic acid crystals filtered and washed. The acid number was 585 and M. P. 96° C.

Example II 100 parts of methyl 9, 10 dihydroxy stearate was converted to a potassium soap by saponification with 25% excess KOH. The concentration of soap was then adjusted to 30% with water.

The above soap solution was added over a period of one and one-half hours to a 70% sodium hydroxide solution, heated to 250 to 260° C. The temperature was maintained at 250 to 260° C. A very fine stream of molecular oxygen was continually passed over the reaction. An alcohol continuously distilled out of the reaction mixture. At the end of a total of 2½ hours of reaction time, the mixture was cooled, diluted, acidulated and the oil layer separated. The oil layer was steam distilled and pelargonic acid recovered. The pelargonic acid had a molecular weight 155.5 and an $N_D$ 26° of 1.4316. The alcohol amounted to 6 parts and had an $N_D$ 25° of 1.4280.

The water layer was evaporated, cooled, crystallized and the crystals filtered and washed. The azelaic acid had an acid number of 595, M. P. 96° C.

The following specific examples of large yield recovery of the monobasic acid and dibasic acid will be further illustrative.

Example III 3.2 parts of 80%, 9, 10 dihydroxy stearic acid was added dropwise to liquid sodium hydroxide which had been preheated to 375° C. It was held under an atmosphere of $CO_2$ during the reaction. Addition of the dihydroxy acid portions lasted 6 minutes. At the end of that time the reaction mass was cooled, diluted with water, acidulated, and the oil layer separated. The oil layer contained pelargonic acid and the water layer contained azelaic acid. No alcohol or omega hydroxy acid could be found. The azelaic acid when isolated was found to have an acid number of 595.

Example IV 3.5 parts of 80% dihydroxy stearic acids which contained both 9, 10 dihydroxy acids and other position isomers were added in small portions to liquid sodium hydroxide which had been preheated to 375° C. The reaction time was 6 minutes. The reaction was held under an atmosphere of $N_2$ with a small amount of air admitted. The mixture was cooled, diluted, acidulated with mineral acid, evaporated and crystallized. The mixed dibasic acid, which was obtained in good yields, was washed and had an acid number of 570. The oil layer contained considerable amounts of monobasic acid in the $C_8$ to $C_{10}$ range. No alcohol was formed.

Example V 105 parts of methyl 9, 10 dihydroxy stearate (purity 92%) was added in small portions over a period of 1½ hours to a mixture of 110 parts of 65% water solution of KOH and 200 parts of high boiling mineral oil which had been preheated to 275° C. The reaction was held under reflux for a total of 3 hours. At the end of that time the mass was cooled, diluted, and the mineral oil separated, it was then acidulated with $H_2SO_4$ and the oil layer which formed was separated. The oil layer was extracted with boiling water and the extraction combined with the original water layer. The water layer was then evaporated, cooled, crystallized and filtered. The azelaic acid when refined had an acid number of 590. The oil layer was steam distilled and found to contain pelargonic acid and small amounts of n-nonyl alcohol.

Example VI 3.4 parts of 80%, 9, 10 dihydroxy stearic acid was added dropwise to liquid sodium hydroxide which was preheated to 435° C. The reaction was held under an atmosphere of $CO_2$. Addition time was 7 minutes. At the end of that time the reaction mass was cooled, diluted with water, acidulated, and the oil layer separated. The oil layer contained pelargonic acid and the water layer contained azelaic acid. No alcohol was found. There was no evidence of decomposition of either the sodium azelate or pelargonate. This

Example VII 892 parts of 9, 10 dihydroxy stearic acid (79%) (low melting form) was added dropwise, to 2000 parts of technical sodium hydroxide. $N_2$ was used over the reaction and steps were taken to be sure that all air was excluded. The temperature was 360 to 370° C. The addition took one hour and 15 minutes and at the end of that time, the mixture was allowed to cool. The mixture at the above temperature was completely liquid. On cooling with agitation, it was reduced to a fine white powder. The thus formed salts were then acidulated, pelargonic acid steam distilled and the azelaic acid extracted with hot water. The azelaic acid crystallized as pure white crystals, and had an acid number of 591. The pelargonic acid was nearly water white and was a good grade of pelargonic acid.

Example VIII 35 parts of 9, 10, 12 trihydroxy stearic acid was added dropwise to 65 grams of technical sodium hydroxide which was heated to 380 to 390° C., the reaction being run in an atmosphere of $N_2$. The addition time was 22 minutes. At the end of that time the mass was cooled, acidulated, and the oil layer separated. The oil layer was steam distilled and there was produced a monobasic acid which had an acid number of 393. From the boiling range it appeared that this acid was caproic acid mixed with small amounts of pelargonic acid. The dibasic acid had an acid number of 574 and an M. P. of 104° C. It was a mixture of azelaic and sebacic acids.

Example IX 28.5 parts of 10, 11, dihydroxy undecanoic acid was added to 30 parts of technical sodium hydroxide. The addition was dropwise and lasted 7 minutes. The temperature of the mass was 375° C. An atmosphere of $N_2$ was used. At the end of 7 minutes the mass was cooled, acidulated in concentrated HCl. The insoluble mass which collected on top was found to be sebacic acid, mixed with an unidentified oil. The mixture was extracted with several portions of boiling water. At the end of the extraction a very small amount of oil remained. The water solution was cooled, crystallized and the acid separated. The M. P. was 130° C., the acid number 552. The material was an excellent grade of sebacic acid.

Example X 75 parts of sodium hydroxide were heated to 320–330° C. and to this was added 50.5 parts of dihydroxy stearic acid dropwise, over a period of 27 minutes. The reaction was held under $N_2$. Some alcohol was detected in the vapors. After addition was completed the mass was cooled, acidulated with mineral acid, the oil layer separated, washed and steam distilled. The pelargonic acid had an acid number of 335 and contained some n-nonyl alcohol.

The residue from steam distillation was extracted with boiling water and the water was cooled and allowed to crystallize. The crystals were separated by filtration. The separated crystals showed an acid number of 546.

Example XI 70 parts of sodium hydroxide were heated to 375° C. in an atmosphere of $N_2$. To the molten sodium hydroxide there was added dropwise 40.1 parts of 13, 14 dihydroxy behenic acid (low melting form). The dihydroxy behenic acid contained about 10% 9, 10 dihydroxy stearic acid. The reaction time was 26 minutes, during reaction temperature was maintained at 370° to 380° C. The salt caustic mixture was completely liquid at the reaction temperature.

The mass was cooled, acidulated with hydrochloric acid, washed and the formed oil layer separated and steam distilled to remove monobasic acids.

The dibasic acid, which was only slight soluble in boiling water, was extracted from the distillation residue with large portions of boiling water.

The water extracts were cooled and crystallized. The recovered crystals had an acid number of 468.5. The dibasic acid was a good grade of brassylic acid which contained a small amount of azelaic acid.

The steam distillable monobasic acid was a good grade of pelargonic acid.

Dehydrogenation catalysts such as nickel and copper chromite appear to have some value but present a problem in removal. Such compounds are in no way necessary to the reaction, but may be found helpful.

What is claimed is:

1. The process for the preparation of dibasic and monobasic acid scission derivatives of polyhydroxy aliphatic acid compounds comprising heating dry caustic to a temperature in the range of from the melting point of the dry caustic to about 475° C., adding the selected polyhydroxy aliphatic acid compound gradually in small portions, said reaction being carried out in an atmosphere having a low oxygen content, cooling the reaction mass, acidulating the thus cooled mass with a mineral acid, removing the formed oil layer, steam distilling said oil layer to remove the monobasic acid and cooling the remaining water to crystallize the dibasic acid.

2. The process for the preparation of dibasic and monobasic acid scission derivatives of polyhydroxy aliphatic acid compounds comprising heating dry causic to a temperature in the range of from the melting point of the dry caustic to about 475° C., adding the selected polyhydroxy aliphatic acid compound gradually in small portions, said reaction being carried out in an atmosphere free of oxygen content, cooling the reaction mass, acidulating the thus cooled mass with a mineral acid, removing the formed oil layer, steam distilling said oil layer to remove the monobasic acid and cooling the remaining water to crystallize the dibasic acid.

3. The process for the preparation of the dibasic and monobasic acid and n-monohydric alcohol scission derivatives of polyhydroxy aliphatic acid compounds comprising maintaining caustic at an elevated temperature and adding the selected polyhydroxy acid to the caustic gradually in small portions.

4. The steps in the process for the preparation of dibasic and monobasic acid scission derivatives of polyhydroxy aliphatic acid compounds comprising heating dry caustic to a temperature in the range of from the melting point of the dry caustic to about 475° C., adding the selected polyhydroxy aliphatic acid compound gradually to said caustic, said reaction being carried out in an atmosphere having a low oxygen content, cooling the reaction mass and acidulating the thus cooled mass with a mineral acid.

5. The steps in the process for the preparation of dibasic and monobasic acid scission derivatives of polyhydroxy aliphatic acid compounds comprising heating dry caustic to a temperature in the range of from the melting point of the dry caustic to about 475° C., adding the selected polyhydroxy aliphatic acid compound gradually to said caustic, said reaction being carried out in an atmosphere free of oxygen, cooling the reaction mass and acidulating the thus cooled mass with a mineral acid.

6. The steps in the process for the preparation of dibasic and monobasic acid scission derivatives of 9,10,12 trihydroxy stearic acid comprising heating dry caustic to a temperature in the range of from the melting point of the dry caustic to about 475° C., adding 9,10,12 trihydroxy stearic acid gradually to the caustic, said reaction being carried out in an atmosphere free of oxygen, cooling the reaction mass and acidulating the thus cooled mass with a mineral acid.

7. The steps in the process for the preparation of sebacic acid scission derivatives comprising heating dry caustic to a temperature in the range of from the melting point of the dry caustic to about 475° C., adding 10,11 dihydroxy undecanoic acid gradually to the caustic, said reaction being carried out in an atmosphere free of oxygen, cooling the reaction mass and acidulating the thus cooled mass with a mineral acid.

8. The process for the preparation of pelargonic acid and brassylic acid, which comprises heating dry caustic in the range of from the melting point of the dry caustic to about 475° C., adding 13,14 dihydroxy behenic acid gradually to said caustic, said reaction being carried out in an atmosphere free of oxygen, cooling the reaction mass and acidulating the thus cooled mass with a mineral acid.

9. The process for the preparation of azelaic acid, normal nonyl alcohol and pelargonic acid, which comprises maintaining a caustic-water solution at a temperature of from 190° C. to 300° C., adding 9,10 dihydroxy stearic acid to caustic-water solution gradually, distilling the thus formed normal nonyl alcohol off, cooling the remaining mass and acidulating the thus cooled mass with a mineral acid.

10. The steps in the process for the preparation of azelaic and pelargonic acid comprising heating dry caustic to a temperature in the range of from the melting point of the dry caustic to about 475° C., adding 9,10 dihydroxy stearic acid gradually to the dry caustic, said reaction being carried out in an atmosphere free of oxygen, cooling the reaction mass and acidulating the thus cooled mass with a mineral acid.

11. The steps in the process for the preparation of azelaic and pelargonic acid comprising heating dry caustic to a temperature in the range of from the melting point of the dry caustic to about 475° C., adding an alkali metal salt of 9,10 dihydroxy stearic acid gradually to the dry caustic, said reaction being carried out in an atmosphere free of oxygen, cooling the reaction mass and acidulating the thus cooled mass with a mineral acid.

12. The process for the preparation of n-monohydric alcohols scission derivatives of polyhydroxy aliphatic acid compounds comprising heating caustic in water solution to a temperature in the range of from about 190° C. to 300° C., adding the selected polyhydroxy aliphatic acid compound gradually to said caustic in water solution and distilling off the thus formed n-monohydric alcohol.

13. The process for the preparation of n-monohydric alcohol scission derivatives of polyhydroxy aliphatic acid compounds comprising heating caustic in water solution to a temperature in the range of from about 190° C. to 300° C., adding the selected polyhydroxy aliphatic acid compound gradually and simultaneously introducing oxygen and distilling off the thus formed n-monohydric alcohol.

ROGER L. LOGAN.

REFERENCES CITED

The following references are of record in the file of this patent:

UNITED STATES PATENTS

| Number | Name | Date |
|---|---|---|
| 2,217,515 | Houpt | Oct. 8, 1940 |
| 2,341,239 | Percy et al. | Feb. 8, 1944 |